United States Patent
Oumi et al.

(10) Patent No.: US 8,023,366 B2
(45) Date of Patent: Sep. 20, 2011

(54) NEAR-FIELD OPTICAL HEAD AND INFORMATION RECORDING APPARATUS

(75) Inventors: Manabu Oumi, Chiba (JP); Masakazu Hirata, Chiba (JP); Majung Park, Chiba (JP)

(73) Assignee: Seiko Instruments Inc. (JP)

(*) Notice: Subject to any disclaimer, the term of this patent is extended or adjusted under 35 U.S.C. 154(b) by 530 days.

(21) Appl. No.: 12/087,073

(22) PCT Filed: Dec. 14, 2006

(86) PCT No.: PCT/JP2006/324899
§ 371 (c)(1),
(2), (4) Date: Aug. 18, 2008

(87) PCT Pub. No.: WO2007/074650
PCT Pub. Date: Jul. 5, 2007

(65) Prior Publication Data
US 2009/0028007 A1      Jan. 29, 2009

(30) Foreign Application Priority Data
Dec. 28, 2005   (JP) .................................. 2005-377737

(51) Int. Cl.
*G11B 11/00* (2006.01)
(52) U.S. Cl. ..................................... 369/13.33; 369/300
(58) Field of Classification Search .................. 369/300, 369/112.27, 121, 13.24, 13.33, 112.01, 13.17, 369/13.14; 360/59
See application file for complete search history.

(56) References Cited

U.S. PATENT DOCUMENTS

| | | | |
|---|---|---|---|
| 6,795,380 B2* | 9/2004 | Akiyama et al. | 369/13.33 |
| 7,289,422 B2* | 10/2007 | Rettner et al. | 369/300 |
| 2002/0167870 A1 | 11/2002 | Akiyama et al. | 369/13.33 |
| 2005/0254355 A1 | 11/2005 | Rettner et al. | 369/13.24 |
| 2010/0091619 A1* | 4/2010 | Hirata et al. | 369/13.24 |
| 2011/0007621 A1* | 1/2011 | Park et al. | 369/112.01 |

FOREIGN PATENT DOCUMENTS

| | | |
|---|---|---|
| JP | 2002-298302 | 10/2002 |
| JP | 2003-045004 | 2/2003 |
| JP | 2003-228802 | 8/2003 |
| JP | 2005-004901 | 1/2005 |
| WO | WO 00/74048 | 12/2000 |
| WO | 03058641 | 7/2003 |

* cited by examiner

*Primary Examiner* — Ali Neyzari
(74) *Attorney, Agent, or Firm* — Adams & Wilks

(57) ABSTRACT

The invention is a near-field optical head that generates near-field light to heat a predetermined area of a medium and applies a magnetic field to the predetermined area to record information, the head including an optical waveguide 103 having a path for propagating a pencil of light, and a tip 117 having an optical minute opening 118 at the position facing against the predetermined area and collecting the pencil of light emitted from the optical waveguide 103 and simultaneously propagating the collected pencil of light to the optical minute opening 118 to generate the near-field light. The optical minute opening 118 is formed by a magnetic pole that applies a magnetic field to the predetermined area.

11 Claims, 6 Drawing Sheets

NEAR-FIELD OPTICAL HEAD AND INFORMATION RECORDING APPARATUS

CROSS-REFERENCE TO RELATED APPLICATION

This application is a U.S. national stage application of International Application No. PCT/JP2006/324899, filed Dec. 14, 2006, claiming a priority date of Dec. 28, 2005, and published in a non-English language.

TECHNICAL FIELD

The invention relates to a near-field optical head using near-field light having a resolution beyond the diffraction limit by localizing light to a minute area, and it particularly relates to a near-field optical head implementing an ultrahigh recording density by using both of near-field light and a magnetic field and an information recording apparatus including it.

In order to respond to the rapid increase in the quantity of image/motion picture information currently available, information recording/reproducing apparatus have been increased in capacity and decreased in size. The density of an optical information recording/reproducing apparatus is increased by using light having a short wavelength since the recording density depends on the optical wavelength. The principle of recording and reproducing using near-field light has received attention as a method for implementing the recording density independent of wavelengths. In a magnetic information recording/reproducing apparatus, in order to separate and magnetize a minute area on the surface of a recording medium, the near-field light assisted magnetic recording that irradiates near-field light only to the minute area to heat and reduce the coercivity and then magnetizes the minute area is seen as a promising candidate of the next generation of the principle of recording and reproducing.

A head of a near-field light assisted magnetic recording apparatus has a conventional structure having a near-field light generating element adjacent to a recording magnetic pole of a magnetic head. The near-field light generating element has multiple planer metallic arms within an optical waveguide and has an opening at each of the distal ends (JP-A-2005-515578 (Pages 6 and 7, FIG. 2): Patent Document 1). The structure has been also proposed in which near-field light is generated at a position adjacent to a magnetic pole by installing a solid immersion lens on a flying head (JP-A-10-162444 (Pages 18 and 19, FIG. 13): Patent Document 2). The importation of light from a light source to an optical waveguide employs a method that irradiates light from a laser directly to an optical waveguide (Patent Document 1) or a solid immersion lens (Patent Document 2).

Problems to be Solved by the Invention

However, in the conventional near-field optical head in the structure having metallic arms within a waveguide, the near-field light generating element has a complicated structure within the waveguide, and it is difficult to form with high precision. In particular, it is extremely difficult to produce multiple metallic arms at different tilted angles within a waveguide produced as a thin film on a substrate.

Since a processing technology is required for cutting out a magnetic recording element and a waveguide after producing them by using a thin-film producing technology and aligning the end surfaces of the waveguide and magnetic recording element on the nanometer level, there has been a problem that the manufacturing cost is high. For the structure employing a solid immersion lens, the lens and a magnetic recording element are produced separately and are then assembled. Therefore, the alignment must have high precision, and the high-volume production has been difficult.

Furthermore, since the recording magnetic pole and the near-field light generating element are separate, the recording magnetic pole and the near-field light generating element must be placed with high precision. Otherwise, the magnetic field from the recording magnetic pole and the near-field light from the near-field light generating element cannot be directed to a desired position on a recording medium. Therefore, easy production of the head has not been allowed.

SUMMARY OF THE INVENTION

Accordingly, the invention was made in view of the aforesaid points. It is an object of the invention to provide a near-field optical head which can be produced easily even without finely aligning components in the head and an information recording apparatus including the near-field optical head.

In order to solve the aforementioned problems, the substance of the first characteristic according to the invention is a near-field optical head that generates near-field light to heat a predetermined area of a medium and applies a magnetic field to the predetermined area to record information, the head including an optical waveguide having a path for propagating a pencil of light, and a near-field light generating element having a magnetic pole gap having an opening at the position facing against the predetermined area and collecting the pencil of light emitted from the optical waveguide and simultaneously propagating the collected pencil of light to the magnetic pole gap to generate the near-field light, wherein the magnetic pole gap is formed by a magnetic pole that applies a magnetic field to the predetermined area.

The substance of the second characteristic according to the invention is that the near-field light generating element includes a pyramidal tip containing a transparent material, and the magnetic pole gap is formed at the pointed end of the pyramidal tip.

The substance of the third characteristic according to the invention is that a part of the magnetic pole is provided at a part of a side of the pyramidal tip.

The substance of the fourth characteristic according to the invention is that the head further includes a magnetic recording element having the magnetic pole and a coil that causes the magnetic pole to generate a magnetic field, wherein the near-field light generating element and the magnetic recording element are provided on a substantially flat-shaped substrate, the substrate has an air-bearing surface at the position where the substrate faces against the medium, and the air-bearing surface is formed such that the near-field light generating element and the magnetic recording element can levitate by keeping a predetermined distance from the surface of the medium by using the air-bearing force generated by the rotation of the medium.

The substance of the fifth characteristic according to the invention is that the magnetic pole contains an opaque material.

The substance of the sixth characteristic according to the invention is that a part of a side of the pyramidal tip has a metallic film.

The substance of the seventh characteristic according to the invention is that the pyramidal tip has a quadrangular pyramid, and two facing sides of the four sides have a part of the magnetic pole.

The substance of the eighth characteristic according to the invention is that the pyramidal tip has a quadrangular pyramid, and two facing sides of the four sides have a metallic film.

The substance of the ninth characteristic according to the invention is that the near-field optical head further includes a magneto-resistive element that reads information recorded on the medium, wherein the magnetic tunnel junction is provided on the same substrate as that of the magnetic recording element.

The substance of the tenth characteristic according to the invention is an information recording apparatus including a light source, a medium that records information with the inversion of magnetization, a near-field optical head having a near-field light generating element that receives light from the light source and generates near-field light from an optical minute opening, a motor that rotates the medium, a suspension arm that brings the near-field optical head closely to the medium, and an actuator that moves the suspension arm to a predetermined position of the medium, wherein the near-field optical head has a first magnetic pole and a second magnetic pole that faces against the first magnetic pole through a magnetic pole gap, and the near-field optical head heats a surface of the medium by generating the near-field light from the optical minute opening and records information on the medium by inverting the magnetization with the magnetic field generated within the magnetic pole gap between the first magnetic pole and the second magnetic pole.

The substance of the eleventh characteristic according to the invention is that the near-field light generating element has a pyramidal tip containing a transparent material, and the magnetic pole gap is provided at the pointed end of the pyramidal tip.

The substance of the twelfth characteristic according to the invention is that a part of the first magnetic pole and the second magnetic pole is provided on a part of a side of the pyramidal tip.

The substance of the thirteenth characteristic according to the invention is that the information recording apparatus further includes a light control section that controls the intensity of light from the light source, a magnetic field control section that controls the magnetic field generated from the magnetic pole gap and an apparatus control section that simultaneously performs modulation on the light control section and the magnetic field control section.

The substance of the fourteenth characteristic according to the invention is that the direction of the magnetization is substantially parallel to the surface of the medium.

The substance of the fifteenth characteristic according to the invention is that the direction of the magnetization is substantially perpendicular to the surface of the medium.

BEST MODE FOR CARRYING OUT THE INVENTION

Embodiment 1

Figure 1:
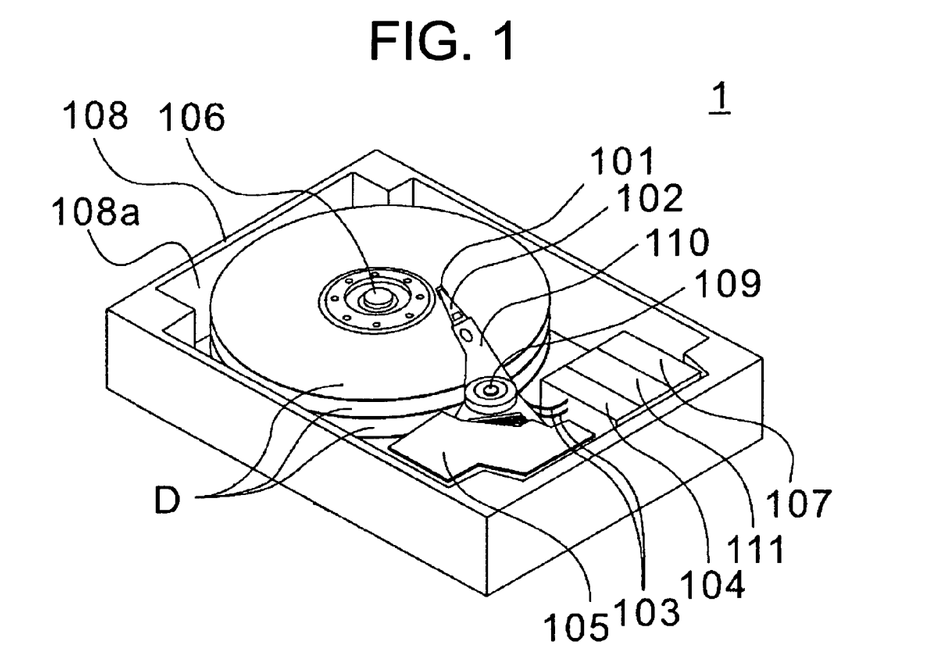
FIG. 1 is a schematic diagram of an information recording apparatus employing a near-field optical head according to Embodiment 1.

FIG. 1 shows an overview of an information recording apparatus employing a near-field optical head 101 according to Embodiment 1 of the invention. An information recording apparatus 1 of this embodiment includes, as shown in FIG. 1, the near-field optical head 101, a suspension arm 102 that is movable in the parallel direction to a surface of a disk (magnetic recording medium) D, supports the near-field optical head 101 on the distal end side so that the near-field optical head 101 can rotate about two axes (which are an X-axis and a Y-axis) which are parallel to the surface of the disk D and are orthogonal to each other and brings the near-field optical head 101 closely to the disk D, a light control section 104 that stores a laser, not shown, that inputs a pencil or beam of light from the proximal end side of an optical waveguide 103 to the optical waveguide 103, an actuator 105 that supports the proximal end side of the suspension arm 102 and scans and moves the suspension arm 102 in the XY directions, which are parallel to the surface of the disk D, a motor (rotation driving unit) 106 that rotates the diskD in a predetermined direction, an apparatus control section 107 that supplies the current modulated according to information to the near-field optical head 101 and controls an operation of the light control section 104, and a housing 108 that internally stores those components. The pencil (beam) of light to the optical waveguide 103 can be modulated in intensity by the light control section 104 as required.

The disk D is a medium having a magnetic recording layer that records information based on the directions of magnetization (or with the inversion). When the disk D is rotated fast with the near-field optical head 101 close to the surface of the disk D by several to several tens nm, the near-field optical head 101 always levitates in a predetermined attitude about the disk D. While optical fiber is used here as the optical waveguide 103 having a path for propagating light, an optical waveguide produced by patterning silicon oxide having a predetermined refractive index or an optical waveguide of resin may be used.

The housing 108 has a square shape in the top view and contains a metallic material such as aluminum. The housing 108 has a concave 108a to accommodate each component internally. A lid, not shown, is removably fixed to the housing 108 to close the opening of the concave 108a.

The motor 106 is attached at the substantial center of the concave 108a. The center hole of the disk D is fitted into the axis of the motor 106, and the disk D is removably fixed thereat. The actuator 105 is attached to a corner of the concave 108a. A carriage 110 is attached to the actuator 105 through a bearing 109. The suspension arm 102 is attached to the end of the carriage 110. Then, the carriage 110 and the suspension arm 102 are movable in the XY direction in response to the driving of the actuator 105.

The carriage 110 and the suspension arm 102 withdraw from the upper part of the disk D in response to the driving of the actuator 105 when the disk D stops rotating. The light control section 104 is attached within the concave 108a adjacently to the actuator 105. A magnetic field control section 111 that controls the magnetic field generated from the near-field optical head 101 by a magnetic circuit, not shown, is placed adjacently to the light control section 104.

The near-field optical head 101 has a minute opening, not shown, and generates near-field light through the minute opening from an input pencil or beam of light. Near field light localizes in a much minuter space than the wavelength of emitted light from the laser and heats the minute area (predetermined area) on the surface of the disk D to temporarily reduce the coercivity of the area only. The near-field optical head 101 heats the minute area on the disk D with the near-field light, applies a magnetic field thereto and inverts the magnetization to record information.

Figure 2:
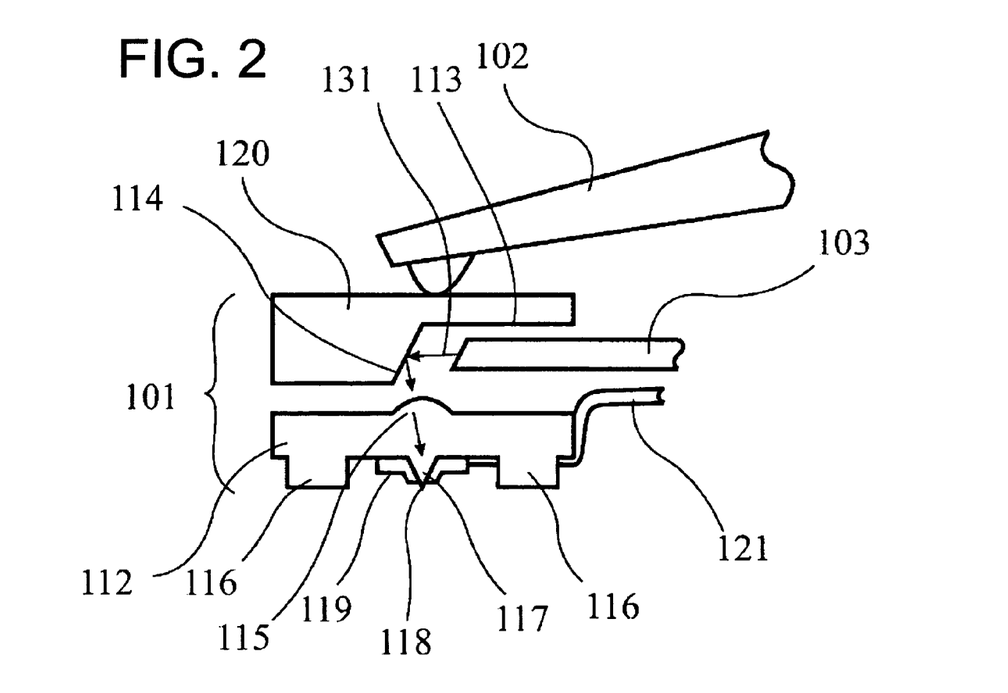
FIG. 2 is a section view of the near-field optical head according to Embodiment 1 and a suspension arm.

FIG. 2 shows a section view of the near-field optical head 101 and the suspension arm 102 according to Embodiment 1 of the invention. The near-field optical head 101 has a double substrate structure having a mirror substrate 120 and a near-field optical element substrate 112, which are bonded together. The mirror substrate 120 has a V-groove 113 formed by performing anisotropic crystalline etching on an Si substrate.

The V-groove 113 has one end extending to a side of the mirror substrate 120 and the other end extending to a mirror 114. The mirror 114 has an evaporated Al film to function as a light reflection surface. The optical waveguide 103 is a polarization maintaining optical fiber and is bonded and fixed to a predetermined position within the V-groove 113. For easy description, the near-field optical element substrate 112 is shown as a result of the rotation by 90° within the substrate plane about the normal of the substrate. The near-field optical element substrate 112 contains quartz glass and has a microlens 115 on the top surface.

The microlens 115 is an aspherical lens formed by etching with a gray scale mask. The bottom surface of the near-field optical element substrate 112 has an air-bearing surface 116 formed by etching.

The air-bearing surface 116 is a surface having a tip (near-field light generating element) 117 and a reading tip (magnetic recording element) 122, which are formed to levitate by keeping a predetermined distance from the disk D by using the air-bearing force generated by the rotation of the disk D.

According to this embodiment, the air-bearing surface 116 may be formed on the surface where the near-field optical element substrate 112 faces against the disk D, for example, among the surfaces of the near-field optical element substrate 112 and is provided in a rail shape at a position across the tip 117 and/or the reading tip 122.

The bottom surface of the near-field optical element substrate 112 has the tip 117 in a square pyramid shape. The pointed end of the tip 117 has an optical minute opening 118. The tip 117 may have a shape other than the square pyramid and may have a cone or triangular pyramid shape. The bottom surface of the near-field optical element substrate 112 further has a magnetic pole 119. The magnetic pole 119 partially covers a side (sloped surface) of the tip 117. A wire 121 is connected to the near-field optical element substrate 112, and the wire 121 forms the coil wound about the magnetic pole 119, which provides an electromagnet as a whole.

The light 131 output from the optical waveguide 103 is reflected by the mirror 114 and then passes through and is collected by the microlens 115 and, passes through the tip 117 and reaches the optical minute opening (magnetic pole gap) 118. The optical minute opening 118 is much minuter in size than the wavelength of the light from the laser and hardly allows normal propagated light to pass through, but near-field light is distributed in a short distance from the optical minute opening 118. The near-field light spreads as wide as the opening size of the optical minute opening 118 and localizes in a much minuter space than the original wavelength.

Figure 3:
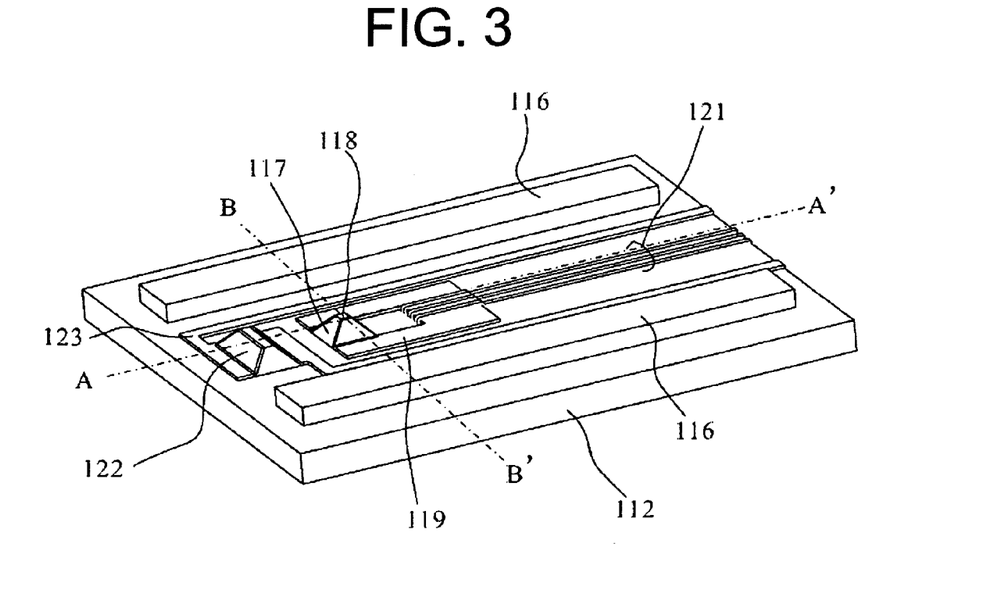
FIG. 3 is an overview diagram of the bottom surface of the near-field optical head according to Embodiment 1.

FIG. 3 is an overview diagram of the bottom surface of the near-field optical head 101 according to Embodiment 1 of the invention. The bottom surface has the air-bearing surface 116 in a substantially rectangular parallelepiped shape, the tip 117, the magnetic pole 119, the wire 121 and the reading tip 122.

The bottom surface of the reading tip 122 has a rectangular pyramid shape, and the two long sides are covered by a part of a magnetoresistive film 123. The magnetoresistive film 123 is patterned from the two sides of the reading tip 122 to the substrate surface. For clear illustration, the structure is shown in a different ratio from that of the actual dimensions.

Figure 4:
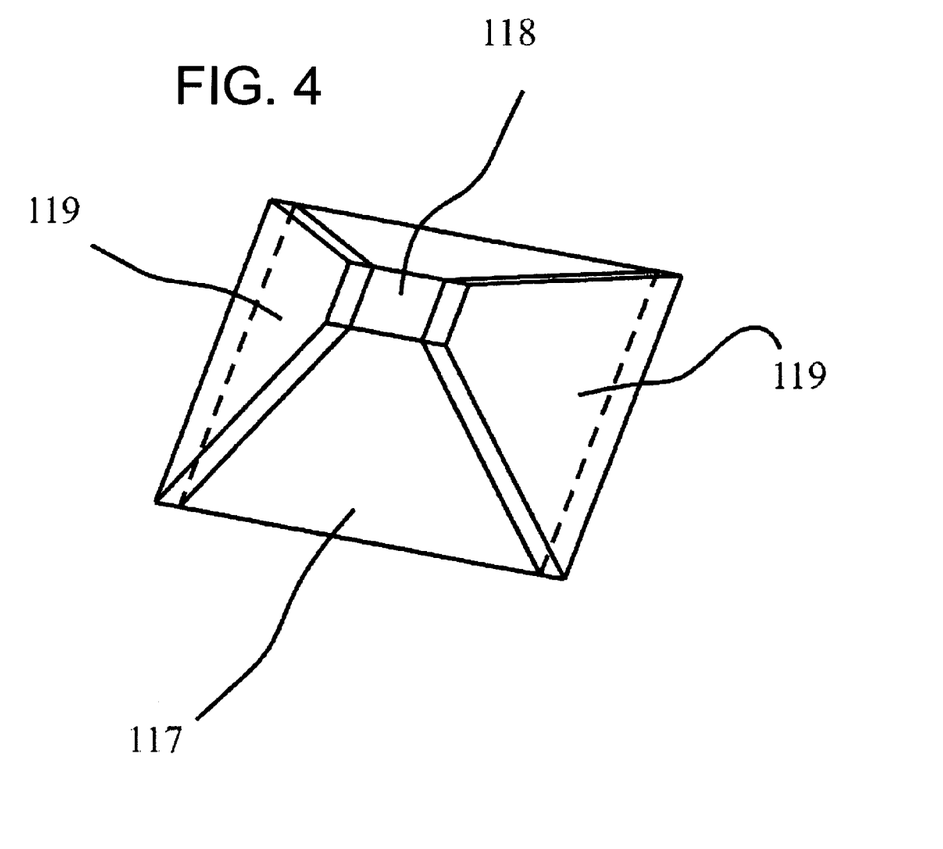
FIG. 4 is an enlarged view of a tip.

FIG. 4 is an enlarged view of the tip 117. The tip 117 has a square pyramid shape. The bottom surface of the tip 117 has sides about 20 µm long and is about 10 µm high. The two facing sides of the four sides of the tip 117 are covered by a part of the magnetic pole 119. Since the magnetic pole 119 does not allow light to pass through, the top surface of the tip 117 has the optical minute opening 118.

Figure 5:
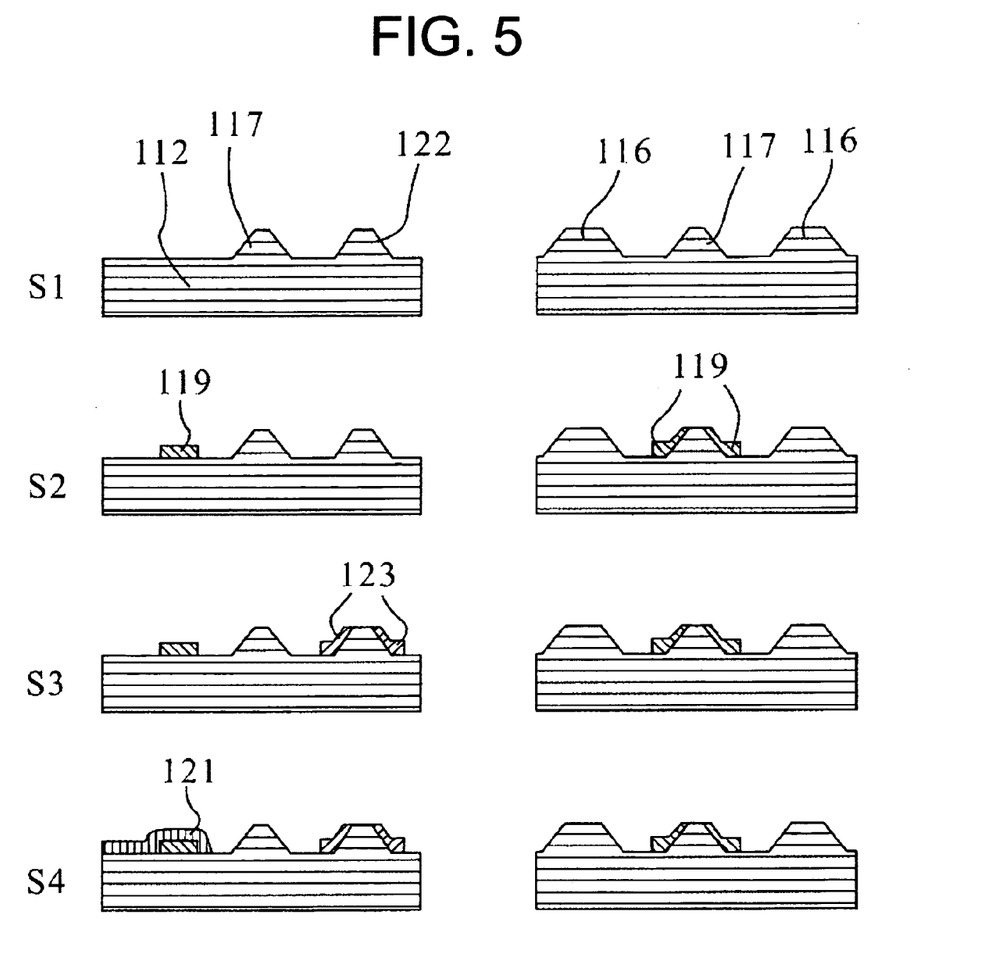
FIG. 5 is a schematic flowchart showing a method of manufacturing the near-field optical head according to Embodiment 1.

FIG. 5 is a schematic diagram of a method of manufacturing the near-field optical head according to Embodiment 1 of the invention. The left column of the figure shows section views taken on the line A-A' in FIG. 3, and the right column shows section views taken on the line B-B'. The rows S1 to S4 show manufacturing steps. In step S1 first of all, the tip 117, the air-bearing surface 116 and the reading tip 122 are produced by performing isotropic etching on the quartz glass substrate 112. Next in step S2, the magnetic pole 119 is produced by a thin film deposition technique such as vapor deposition. The magnetic pole 119 only has a gap in the minute area of the top surface of the tip 117. After a film is deposited over the top surface, a structure is produced in which the magnetic pole film is removed from the top surface only by applying mechanical pressure thereto. Next in step S3, the magnetoresistive film 123 is deposited. Finally in step S4, the wire 121 is patterned.

In this manufacturing method according to the invention, the three-dimensional structure of the tip 117, air-bearing surface 116 and reading tip 122 can be produced only by etching the quartz glass substrate 112. Thus, the near-field optical head 101 can be produced in high volume in a stable manner and at low costs.

The near-field optical head 101 manufactured in this way functions as follows. The disk D is rotated at a high speed, and the near-field optical head 101 is brought closely to the surface. Thus, the air-bearing surface 116 receives air-bearing force from the air flowing above the surface of the disk D, and the near-field optical head 101 levitates from the surface of the disk D by a minute distance of several to several tens nm. The minute area on the surface of the disk D is heated by the near-field light occurring from the optical minute opening 118, and the coercivity of the area only is temporarily reduced. The current resulting from the modulation according to the information to be recorded is fed to the wire 121, and a magnetic flux is generated in the magnetic pole 119 by the current magnetic field. The magnetic pole 119 covers two sides of the tip 117 and has a magnetic pole gap at the part having the optical minute opening 118. Therefore, a magnetic leak field occurs from the optical minute opening 118.

The near-field light from the optical minute opening 118 heats the minute area of the disk D, and, after the coercivity in the area is reduced, the direction of the magnetization is inverted by the action of the magnetic leak field. Thus, the information is recorded in the minute area. Since the magnetic leak field acts efficiently only on the minute area heated by near-field light, the control is also possible to perform the modulation on the laser in synchronization with the modulation on the current to the wire 121.

The reading (reproduction) of the information from the disk D is performed by the same method as that for conventional magnetic heads and can be performed by measuring changes in resistance of the magnetoresistive film 123 deposited on the reading tip 122.

Since the optical minute opening 118 from which near-field light for locally heating the surface of the disk D occurs and the magnetic pole gap from which the magnetic leak field for locally inverting the magnetization of the surface of the disk D occurs share one same structure, information can be recorded in a minute area on the nanometer level with minimum amounts of incident light energy and current.

More specifically, the heating with near-field light and recording with a magnetic field are performed precisely at a same position by causing the near-field light at the same position as that of the magnetic leak field occurring from the tip top surface 118. Therefore, the minute area of the surface of the disk D can be magnetized only with the magnetic leak field from the tip top surface 118, which is defined by the size of the tip top surface 118 facing against the disk D, and a recording apparatus having a high density recording performance can be implemented.

Since the tip 117 is applicable to both of the structure for causing near-field light and the structure for causing a magnetic leak field, the head based on the complex principle, near-field light assisted magnetic recording, can have the extremely simple structure, which is suitable for high-volume production at low costs.

In other words, according to the invention, the integration of the tip 117 and the magnetic pole 119 allows easy manufacturing of the near-field optical head 101 without the fine alignment of the tip 117 and the magnetic pole 119. Since the optical minute opening 118 of the tip 117 is formed by the magnetic pole 119, the displacement between the irradiation areas to the disk D of the near-field light from the optical minute opening 118 and the magnetic field from the magnetic pole 119 can be suppressed, and the near-field light and the magnetic field can be irradiated to a substantially same area on the disk D. Thus, information can be recorded thereon in higher density than that of conventional cases.

Particularly, the section area of the tip 117 according to this embodiment, which faces against the disk D and is orthogonal to the direction from one end to the other end, gradually increases. Thus, from the tip top surface 118, which is the one end, to the other end, the distance between the magnetic pole 119 included in the tip 117 and the disk D increases, and the influence by the magnetic leak field decreases.

Therefore, recording is only performed with the magnetic leak field from the part on the same plane as that of the tip top surface 118 of the magnetic pole 119. Furthermore, since the sides of the tip 117 is apart from the disk D, the magnetic leak field reaching the surface of the disk D is extremely small, and the influence on the recording operation is ignorable. In this way, the near-field optical head supporting high density recording can be implemented by suppressing the spread of the magnetic leak field.

According to the invention, the air-bearing surface 116 is pushed up in the direction away from the disk D by the air levitating from the disk D with the rotation of the disk D. Thus, only providing the air-bearing surface 116 can bring the tip 117 close to the disk D on the nanometer level. Therefore, both of the interaction between the near-field light and the surface of the disk D and the interaction between the magnetic field and the surface of the disk D can be implemented highly efficiently, and the recording in high density can be performed with a high S/N.

Furthermore, according to the invention, recording and reproducing can be performed by one same head, and the near-field optical head suitable for a thin and compact recording apparatus can be implemented.

According to the invention, by synchronizing the occurrence of the near-field light and the occurrence of the magnetic field, they can be modulated, and an information recording apparatus having a recording performance in high density can be implemented.

Embodiment 2

Figure 6:
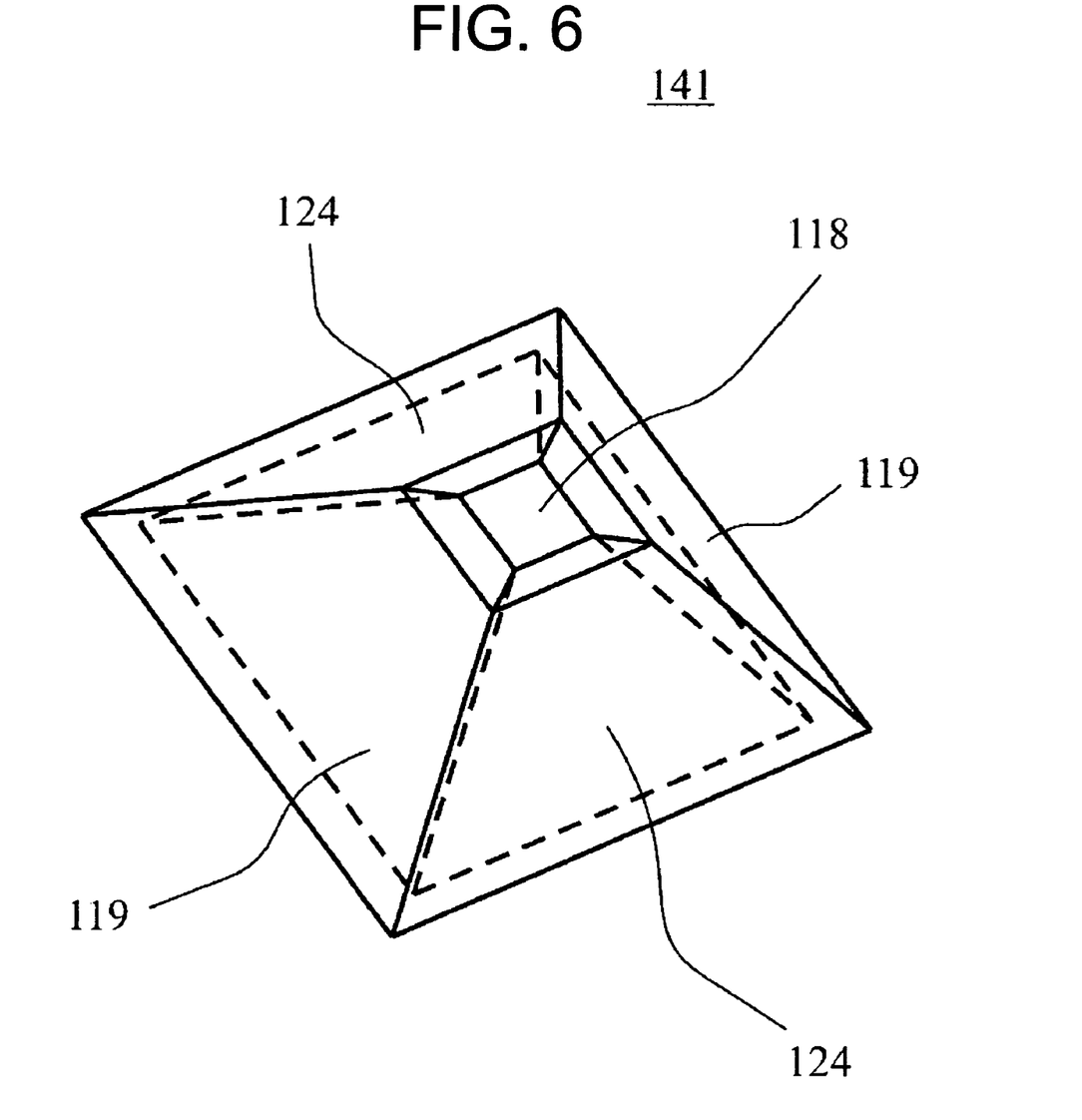
FIG. 6 is an enlarged view of the tip of a near-field optical head according to Embodiment 2.

FIG. 6 is an enlarged view of a tip 141 of a near-field optical head according to Embodiment 2 of the invention. Since the configuration of the entire information recording apparatus and the overview of the near-field optical head according to this embodiment are the same as those of Embodiment 1, the descriptions will be omitted herein. This embodiment is different from Embodiment 1 in that a side of the tip that causes near-field light and, at the same time, causes the magnetic leak field has an Au film 124. The Au film 124 is about 20 nm thick and is produced by vapor deposition.

With the characteristic, since both of the magnetic pole 119 and the Au film 124 do not allow light to pass through, near-field light occurs only from the optical minute opening 118, and light can be more localized than Embodiment 1.

Since the incident light excites plasmon on the surface of the Au film 124, extremely strong near field light can be generated, and a minute area on the disk D can be rapidly heated in a short period of time. By using the near-field optical head having the tip 141 in the structure as described above, recording/reproduction in ultrahigh density can be implemented with a high S/N.

Embodiment 3

Figure 7:
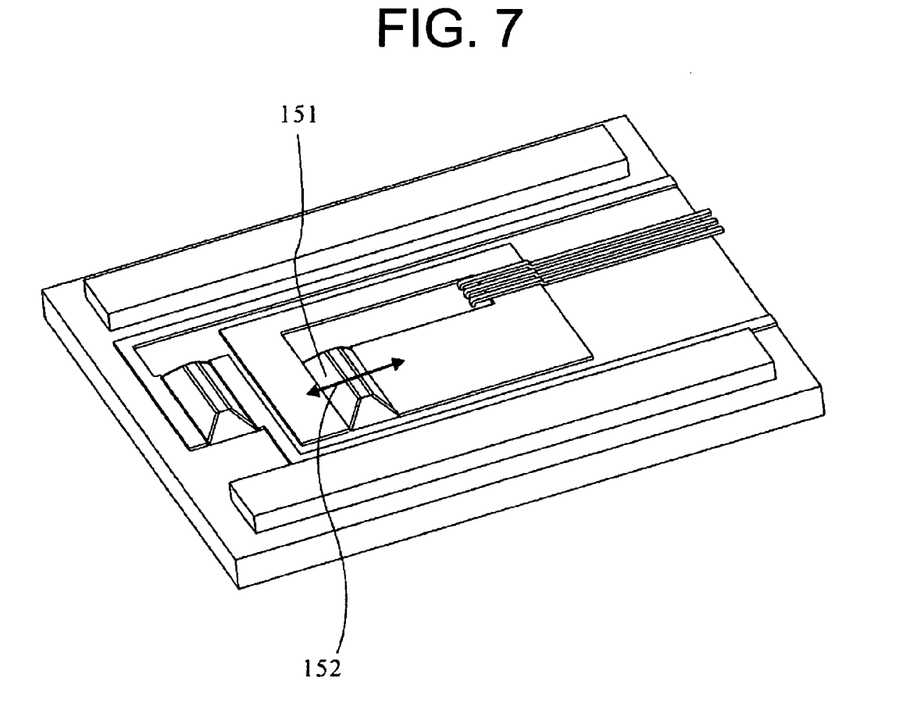
FIG. 7 is an overview diagram of the bottom surface of a near-field optical head according to Embodiment 3.

FIG. 7 is an enlarged view of the bottom surface of the near-field optical head according to Embodiment 3 of the invention. The descriptions on the same parts as those of Embodiment 1 will be omitted herein. This embodiment is different from Embodiment 1 in that the tip that causes near field light and that causes a magnetic leak field is a wedge tip 151. The wedge tip 151 has a side, which is longer several to several tens times than the longitudinal (or horizontal, in the figure) side orthogonal to the longer side, among the sides of the rectangular bottom surface. When the light having a polarization direction 152 in the figure is input from the top surface of the head (or back face in the figure) to the tip in the above-described shape, like Embodiment 1, the light can reach the opening with less attenuation of the light. The caused near field light spreads long in the direction of the long side of the wedge tip and is distributed in an extremely localized manner in the direction of the short side. Recording in high density can be implemented by scanning recording bits on the surface of the disk D in the direction of the short side of the wedge tip.

Figure 8:
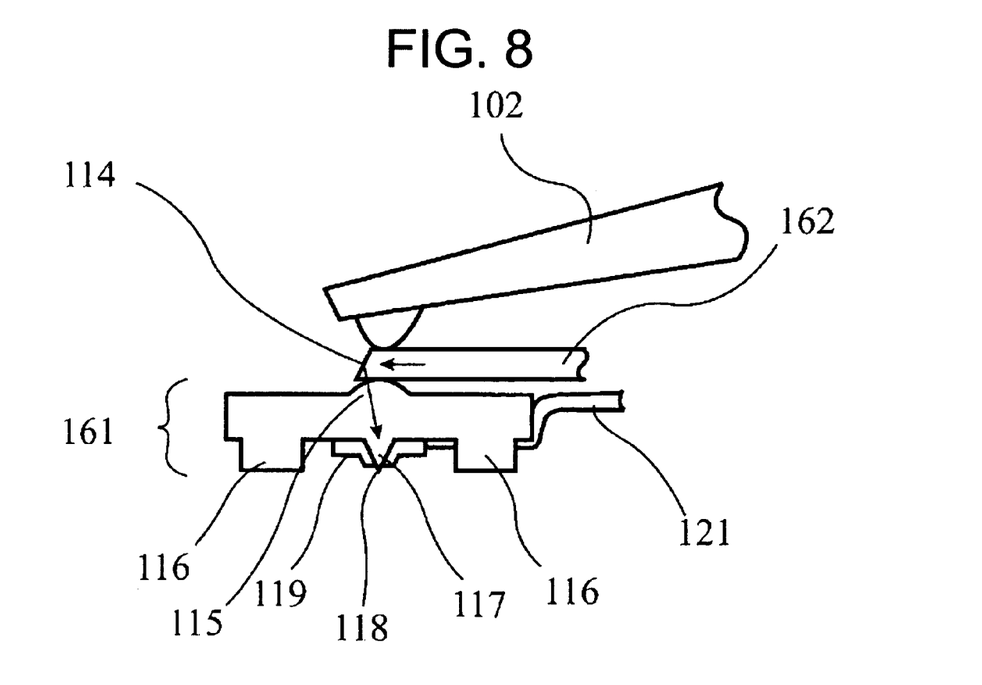
FIG. 8 is a structure diagram of a near-field head including one substrate.

Having described the embodiments up to this point in that the near-field optical head includes two substrates of a substrate having a mirror and a substrate having a near-field optical element, the invention is not limited to the heads in the structure. For example, FIG. 8 shows a structure of a near-field optical head 161 including one substrate. The same reference numerals are given to the same components of those of the embodiments described up to this point, and the descriptions will be omitted herein. In this example, a pointed end 114 of optical fiber 162 is processed diagonally by 45° and has a mirror. After light is reflected by the mirror, the light enters to the microlens 115 of the near-field optical head 161. The subsequent steps are the same as those of Embodiment 1. In this way, the light importing part of the near-field optical head can have various structures, which can implement information recording apparatus in ultra high density in combination with the structure of the invention.

Embodiment 4

Figure 9:
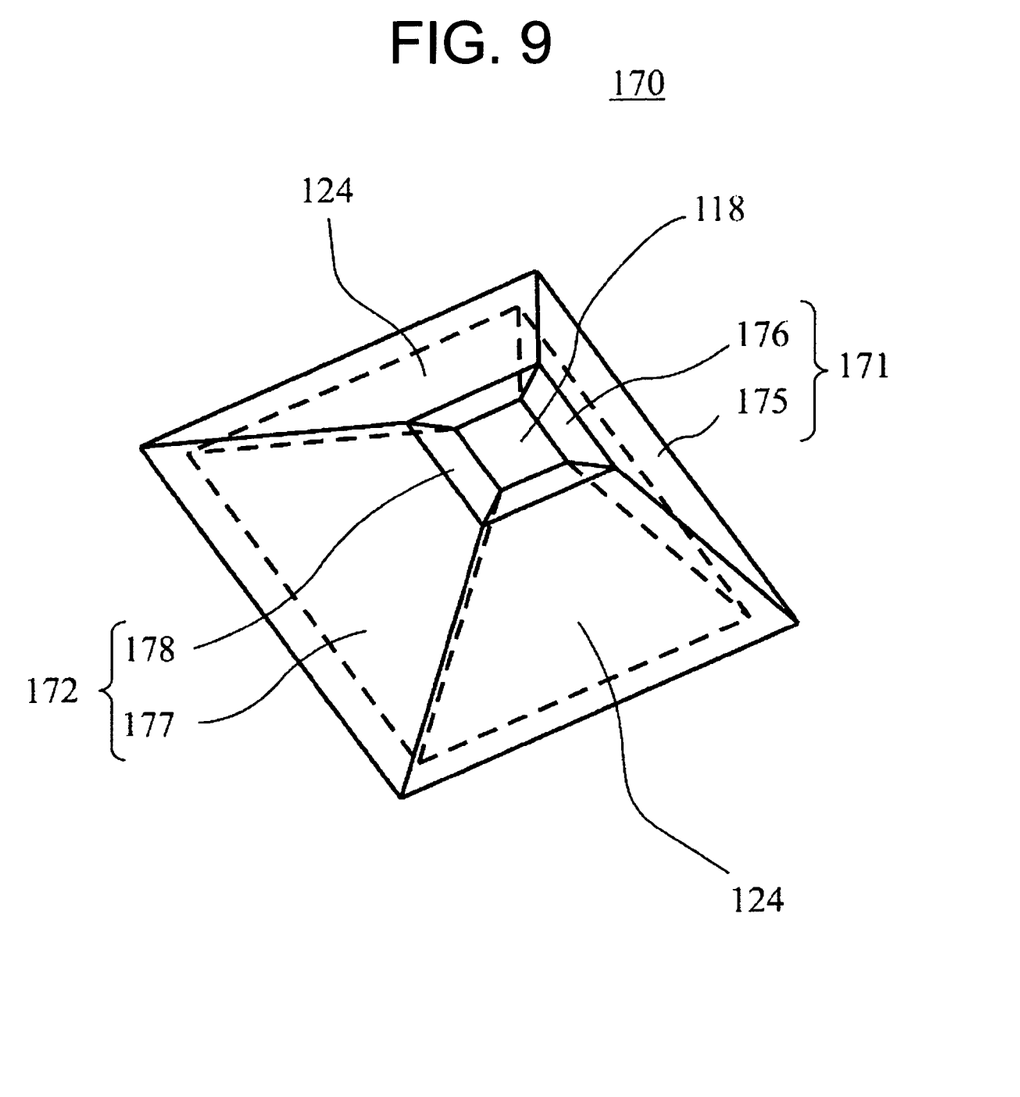
FIG. 9 is an enlarged view of the tip of the near-field optical head according to Embodiment 3.

FIG. 9 is an enlarged view of a tip 170 of a near-field optical head according to Embodiment 3. The configuration of the entire information recording apparatus and the overview of the near-field optical head according to this embodiment are the same as those of Embodiment 2, and the descriptions therefore will be omitted herein. According to this embodiment, the magnetic field generated from a part 176 on the same plane as the tip top surface 118 of a first magnetic pole 171 is perpendicular to the surface of a disk D, not shown, and the return magnetic field from the surface of the disk D returns to a part 178 on the same plane of the tip top surface 118 of a second magnetic pole 172. Thus, recording by the magnetization in the vertical direction on the surface of the disk D, that is, perpendicular recording is implemented. Since a part 175 on a side of the tip of the first magnetic pole 171 and a part 177 in a side of the tip of the second magnetic pole 172 are away from the surface of the disk D, the influence on the recording operation is ignorable. In the perpendicular recording, the size of the part contributing to the recording in the first magnetic pole 171 must be minute for recording in high density. According to the invention however, since the first magnetic pole 171 is provided on a side of a pyramidal tip, the recording density is defined by the size of the part 176 on the same plane of the tip top surface 118. Thus, information recording apparatus in ultrahigh density can be implemented.

INDUSTRIAL APPLICABILITY

According to the invention, a near-field optical head can be produced easily without finely aligning components of the near-field optical head.

The invention claimed is:

1. A near-field optical head that generates near-field light to heat a predetermined area of a medium and applies a magnetic field to the predetermined area to record information, the head comprising:
   an optical waveguide having a path for propagating a beam of light; and
   a near-field light generating element having a magnetic pole gap having an opening at a position facing toward the predetermined area and collecting the beam of light emitted from the optical waveguide and simultaneously propagating the collected beam of light to the magnetic pole gap to generate near-field light,
   wherein the magnetic pole gap is formed by a magnetic pole that applies a magnetic field to the predetermined area, the near-field light generating element includes a pyramidal tip containing a transparent material, the magnetic pole gap is formed at the pointed end of the pyramidal tip, and a part of the magnetic pole is provided at a part of a side of the pyramidal tip.

2. The near-field optical head according to claim 1; the head further comprising a magnetic recording element having the magnetic pole and a coil that causes the magnetic pole to generate a magnetic field, wherein the near-field light generating element and the magnetic recording element are provided on a substantially flat-shaped substrate, the substrate has an air-bearing surface at the position where the substrate faces toward the medium, and the air-bearing surface is formed such that the near-field light generating element and the magnetic recording element can levitate by keeping a predetermined distance from the surface of the medium by using the air-bearing force generated by the rotation of the medium.

3. The near-field optical head according to claim 1; wherein the magnetic pole contains an opaque material.

4. The near-field optical head according to claim 1; wherein a part of a side of the pyramidal tip has a metallic film.

5. The near-field optical head according to claim 1; wherein the pyramidal tip has a quadrangular pyramid, and two facing sides of the four sides have a part of the magnetic pole.

6. The near-field optical head according to claim 1; wherein the pyramidal tip has a quadrangular pyramid, and two facing sides of the four sides have a metallic film.

7. The near-field optical head according to claim 2; further comprising a magneto-resistive element that reads information recorded on the medium, wherein a magnetic tunnel junction is provided on the same substrate as that of the magnetic recording element.

8. An information recording apparatus comprising: a light source, a medium that records information by inversion of magnetization, a near-field optical head having a near-field light generating element that has an optical minute opening and that receives light from the light source and generates near-field light from the optical minute opening, a motor that rotates the medium, a suspension arm that brings the near-field optical head closely to the medium, and an actuator that moves the suspension arm to a predetermined position of the medium,
   wherein the near-field optical head has a first magnetic pole and a second magnetic pole that faces the first magnetic pole through a magnetic pole gap, the near-field light generating element has a pyramidal tip containing a transparent material, the magnetic pole gap is provided at the pointed end of the pyramidal tip, and a part of the first magnetic pole and the second magnetic pole is provided on a part of a side of the pyramidal tip; and
   the near-field optical head heats a surface of the medium by generating the near-field light from the optical minute opening and records information on the medium by inverting the magnetization with the magnetic field generated within the magnetic pole gap between the first magnetic pole and the second magnetic pole.

9. The information recording apparatus according to claim 8; the apparatus further comprising a light control section that controls the intensity of light from the light source, a magnetic field control section that controls the magnetic field generated from the magnetic pole gap and an apparatus control section that simultaneously performs modulation on the light control section and the magnetic field control section.

10. The information recording apparatus according to claim 8; wherein the direction of the magnetization is substantially parallel to the surface of the medium.

11. The information recording apparatus according to claim 8; wherein the direction of the magnetization is substantially perpendicular to the surface of the medium.

* * * * *